United States Patent Office 3,512,391
Patented May 19, 1970

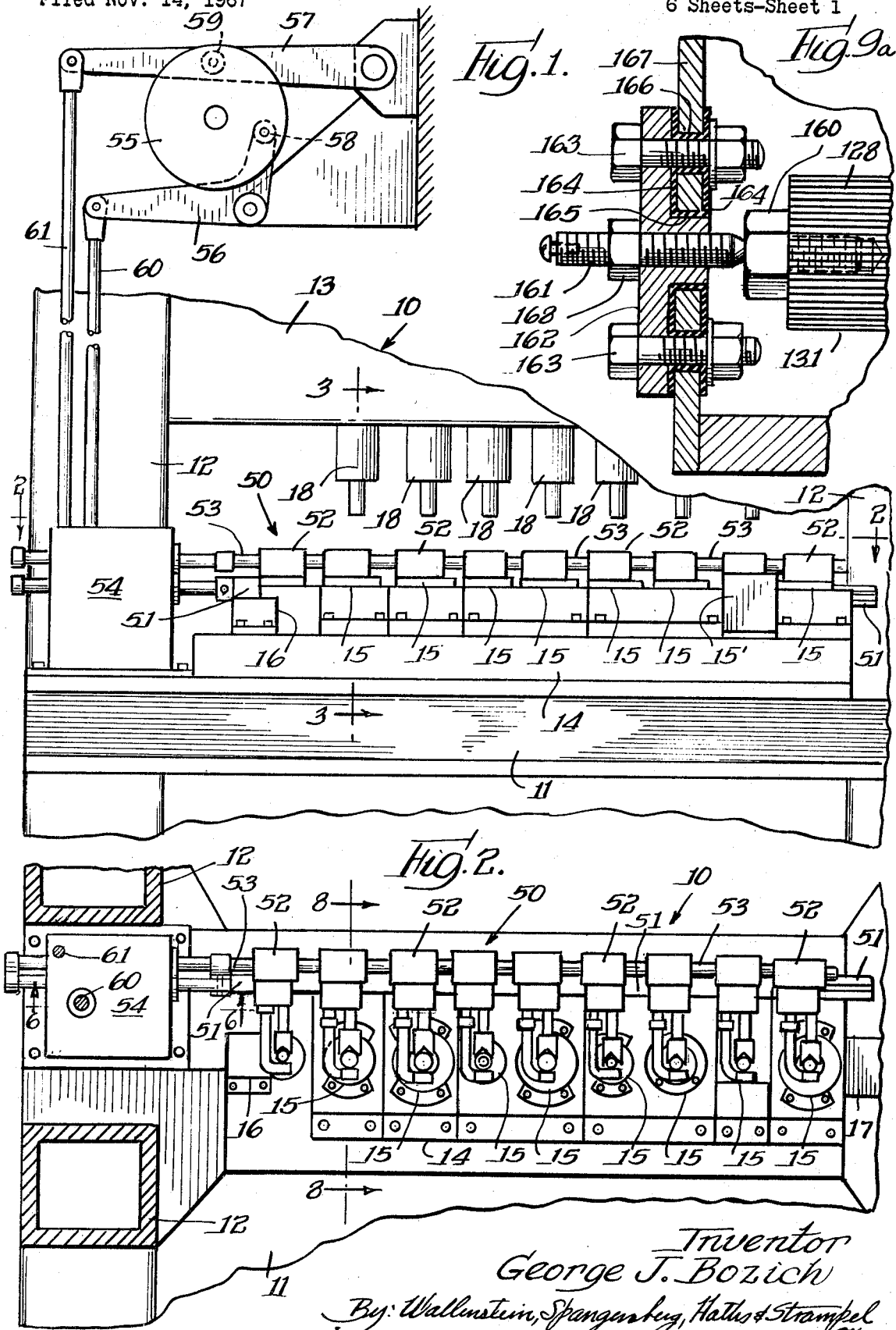

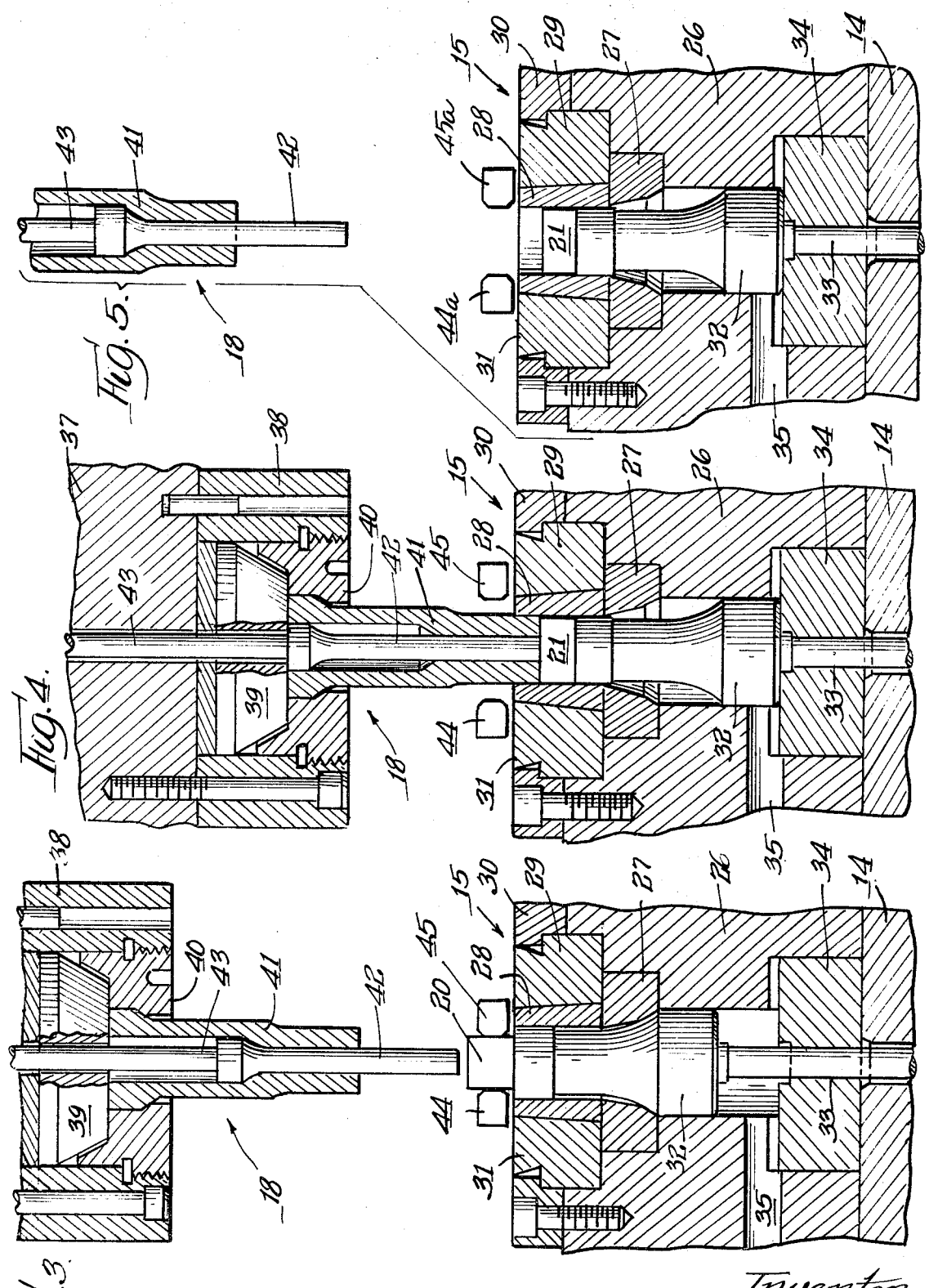

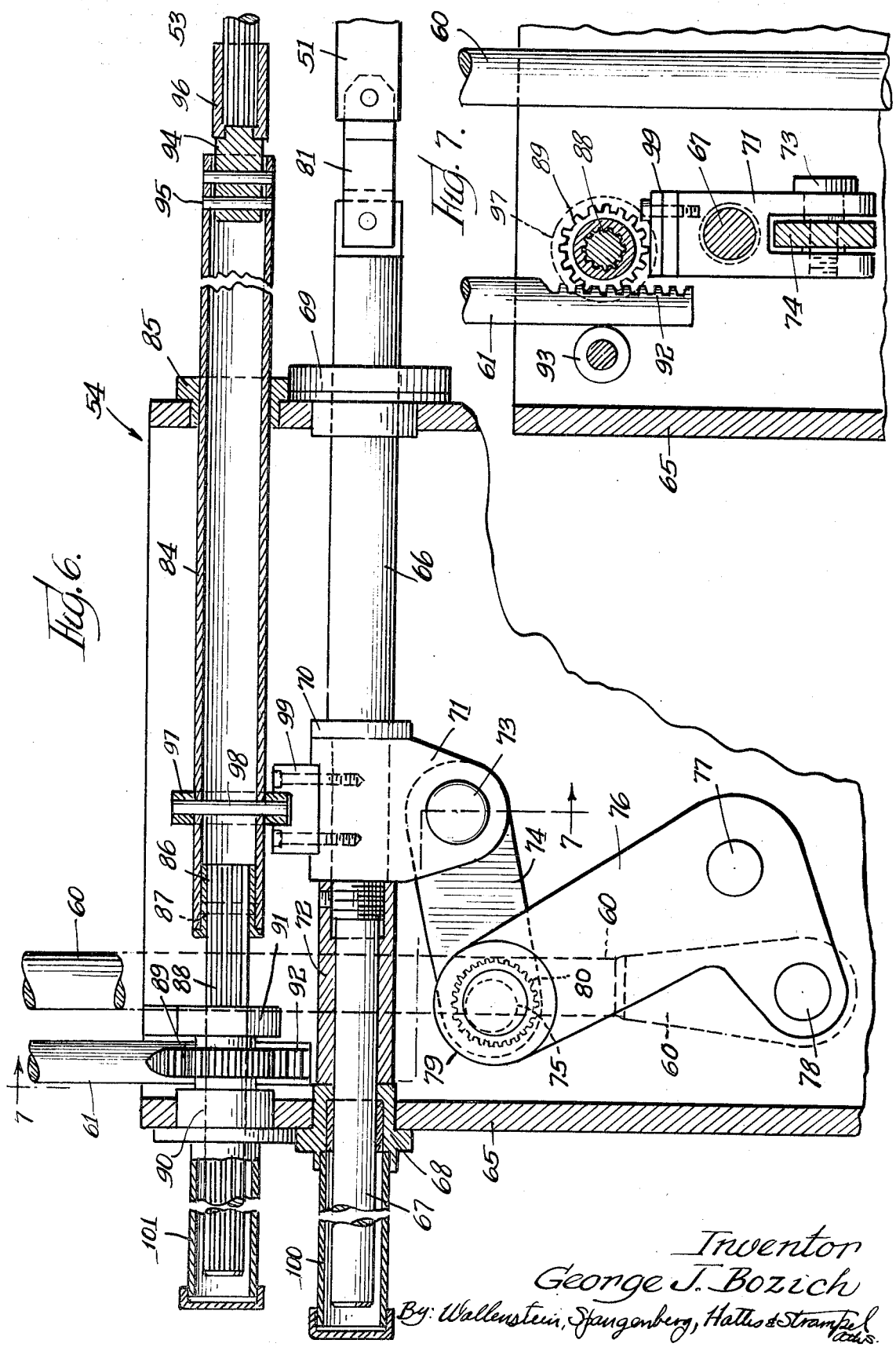

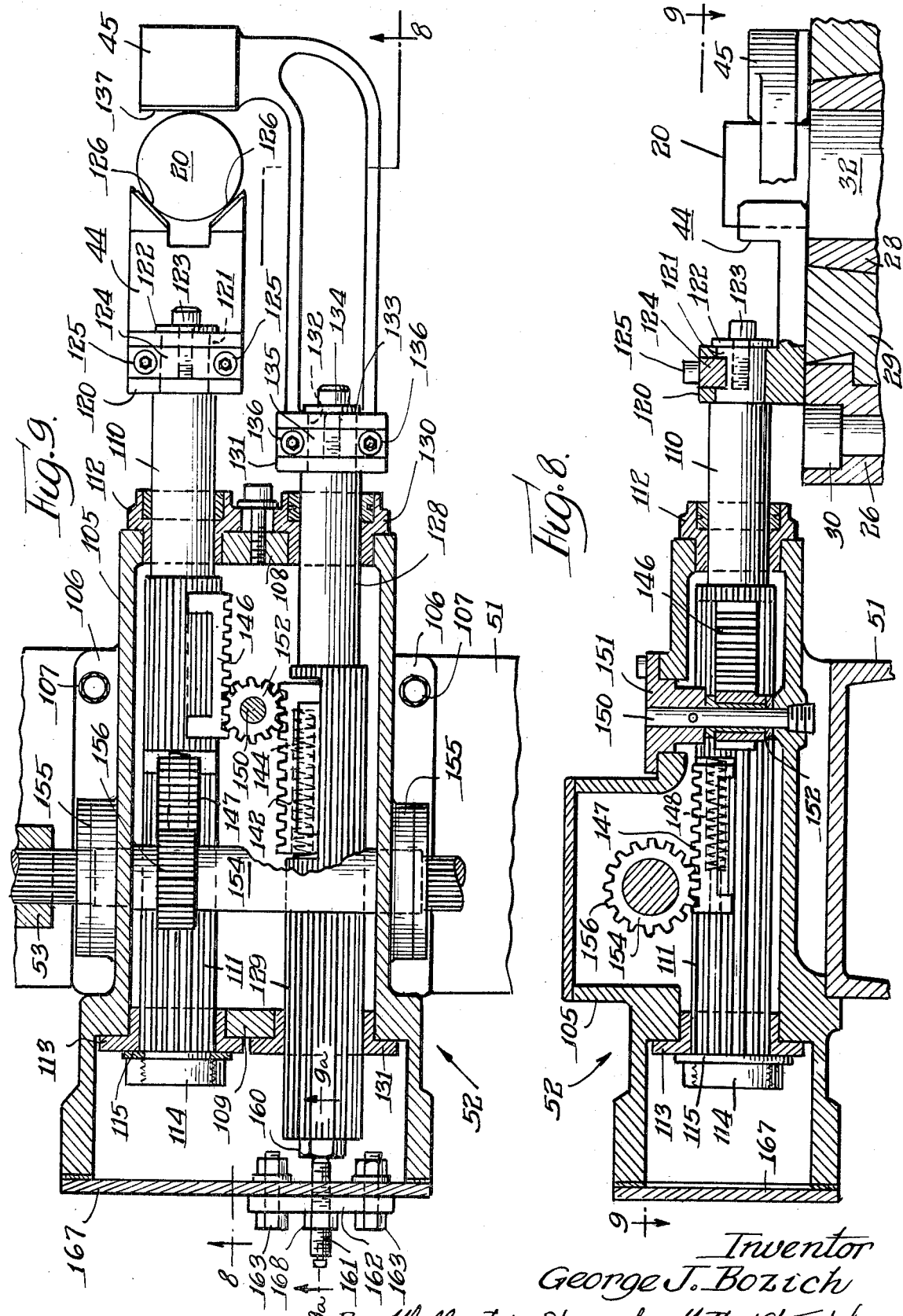

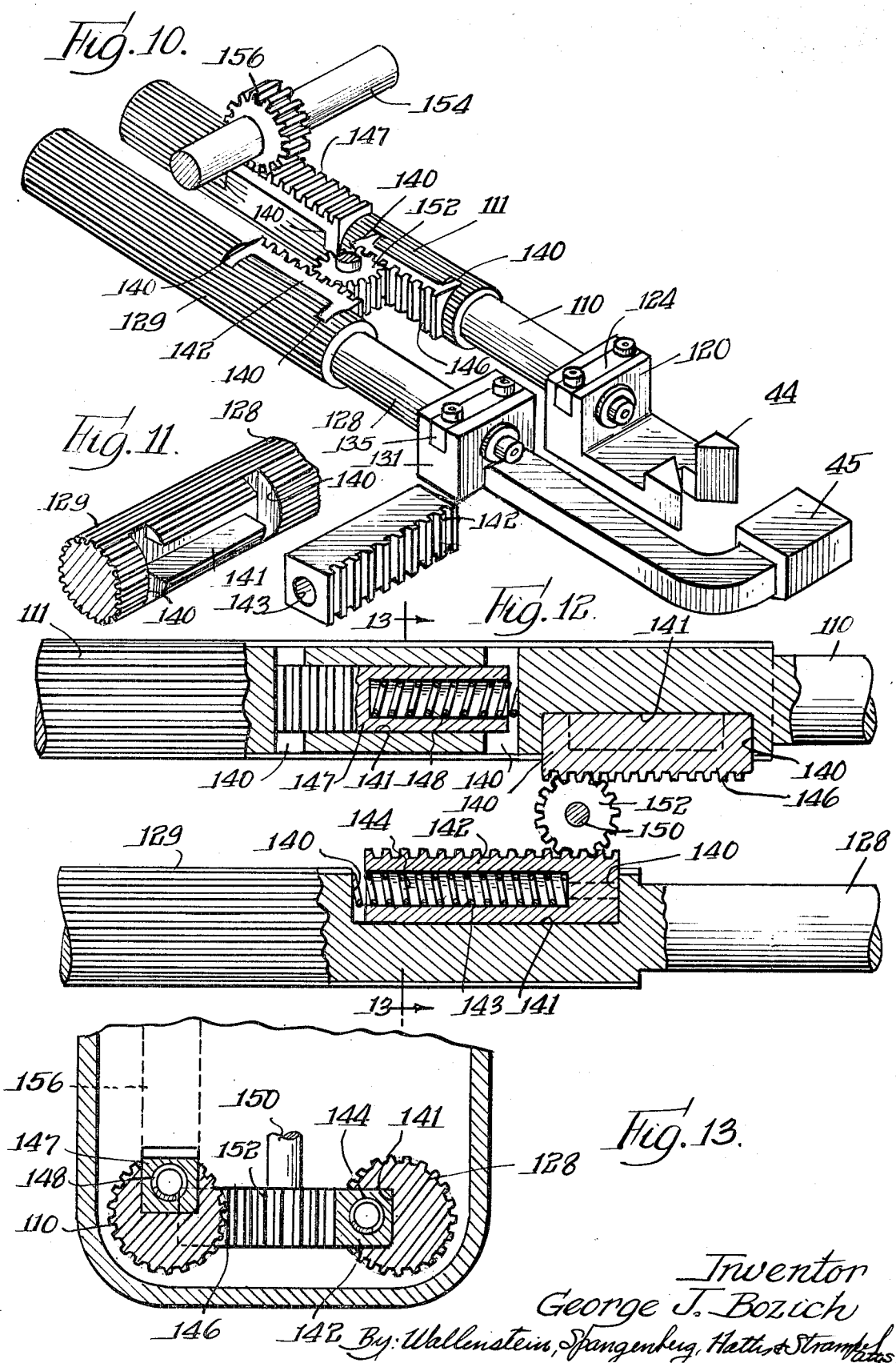

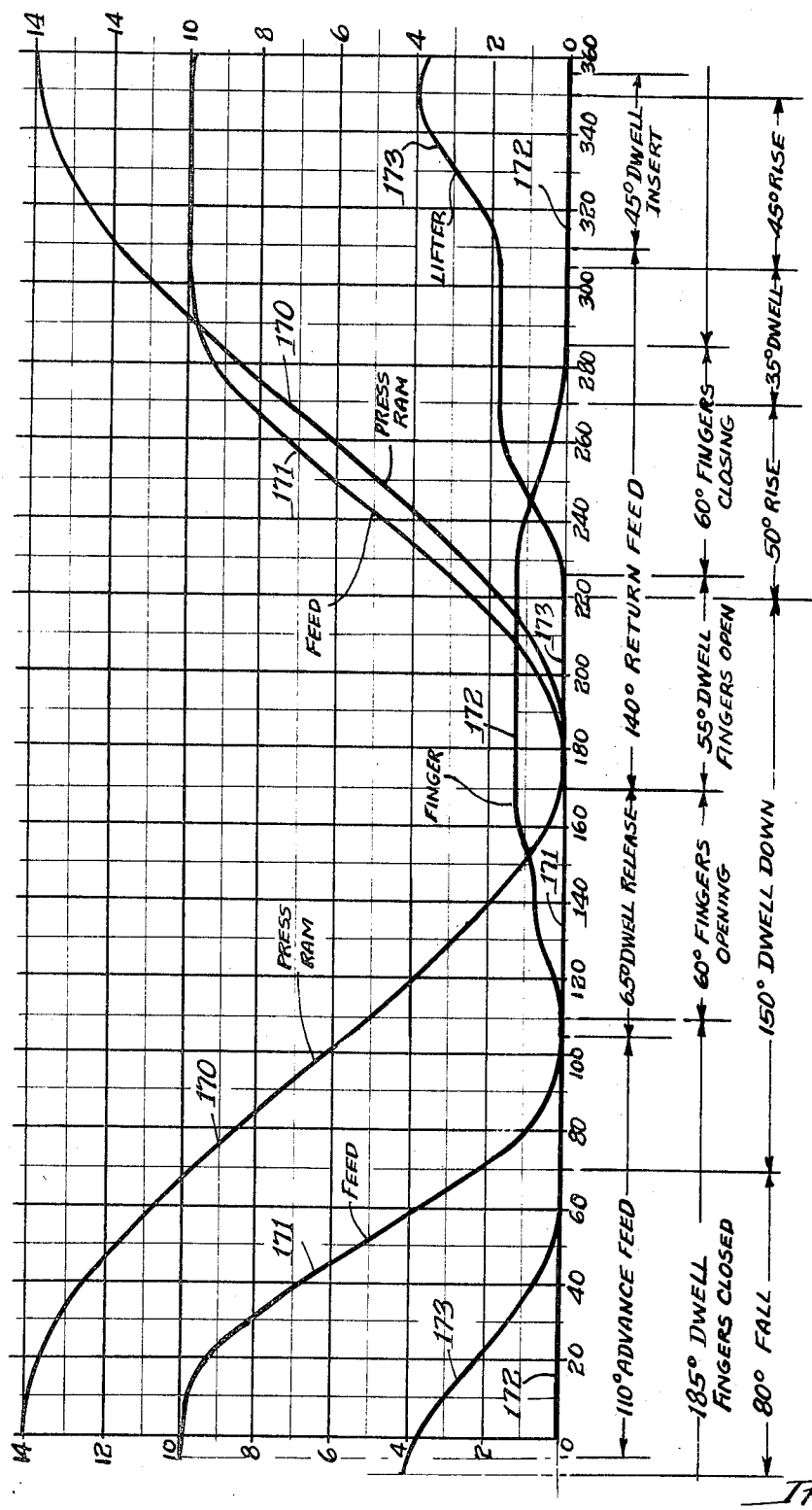

3,512,391
TRANSFER ASSEMBLY FOR PRESSES
George J. Bozich, Chicago, Ill., assignor to Verson Allsteel Press Company, Chicago, Ill., a corporation of Delaware
Filed Nov. 14, 1967, Ser. No. 682,890
Int. Cl. B21d 43/05, 43/10
U.S. Cl. 72—361                   24 Claims

ABSTRACT OF THE DISCLOSURE

A multi-station press (having a bed, a plurality of dies carried by and arranged along the bed, a vertically reciprocatable ram above the bed, and a plurality of punches carried by the ram and cooperating with the dies to perform work functions on work pieces in the dies as the ram is vertically reciprocated) is provided with a transfer assembly including a feed bar longitudinally movable in opposite directions along the press and a plurality of gripper mechanisms carried by the bar for gripping and transferring the work pieces from die to die along the press as the feed bar is longitudinally moved.

---

A principal object of this invention is to provide improved gripper mechanisms in such a transfer assembly for such a press. Briefly, in this connection, each gripper mechanism includes a gripper housing carried by the feed bar, and first and second rods slidably carried by the housing for lengthwise movement transversely of the feed bar and extending from the housing toward a die. The first rod has an outwardly facing gripper finger on its end above the die and the second rod has an inwardly facing gripper finger on its end above the die. The first rod is advanced to an advanced position and the second rod is retracted to a retracted position for closing the gripper fingers thereof to grip a work piece therebetween centrally above a die. The first rod is retracted to a retracted position and the second rod is advanced to an advanced position for opening the gripper fingers thereof to release the work piece therefrom centrally above a die. Driving means are provided for simultaneously advancing the first rod and retracting the second rod and simultaneously retracting the first rod and advancing the second rod.

Further objects of this invention reside in the details of construction of the gripper mechanisms and in the cooperative relationships between the component parts thereof as disclosed more fully hereafter.

Another principal object of this invention has to do with the cooperative relationships between the transfer assembly and the press as described above. Briefly, in this connection, operating means are provided for longitudinally moving and positioning the feed bar to position the feed bar in a retracted position with the gripper fingers above one die as the ram approaches the top of its upstroke, to advance the feed bar toward an advanced position as the ram descends from the top of its downstroke, to position the feed bar in the advanced position with the gripper fingers above the next adjacent die as the ram approaches the bottom of its downstroke, and to retract the feed bar toward the retracted position as the ram rises from the bottom of its upstroke. Operating means are also provided for the driving means of the gripper mechanisms to maintain the gripper fingers closed while the feed bar is in said retracted position with the gripper fingers above said one die and while the feed bar is being advanced toward said advanced position, to open the gripper fingers when the feed bar is in said advanced position with the gripper fingers over said next adjacent die, to maintain the gripper fingers opened when the feed bar starts its movement toward the retracted positions, and to close the gripper fingers as the feed bar completes its movement toward said retracted position. The closed gripper finegrs grip a work piece from said one die and the opening of the gripper fingers releases the work piece at said next adjacent die.

The press also includes ejector means for the dies for ejecting the work pieces therefrom, the ejector means operating to eject the work pieces from said one die into the closed gripper fingers thereover. Further, a pressure biased member is associated with each of the ram punches for pinching the work piece between it and the ejector means of said next adjacent die to hold the work piece as the gripper fingers above said next adjacent die are opening prior to the punch performing a work function on the work piece in said next adjacent die.

The transfer assembly of this invention may be utilized in presses for providing many different types of work functions on work pieces. As one example, reference is made to Orville J. Constant patent application Ser. No. 682,878, filed Nov. 14, 1967, wherein bar stock is cold extruded into bearing races.

Other objects and advantages of this invention will become apparent to those skilled in the art upon reference to the accompanying specification, claims and drawings in which:

FIG. 1 is a schematic and partial front elevational view of a multi-station press having the transfer assembly of this invention applied thereto;

FIG. 2 is a horizontal sectional view of the press taken substantially along the line 2—2 of FIG. 1;

FIG. 3 is an enlarged vertical sectional view through a die structure of one of the stations taken substantially along the line 3—3 of FIG. 1, and illustrating the position of the parts as the press ram is descending;

FIG. 4 is an enlarged vertical sectional view similar to FIG. 3 but illustrating the position of the parts when the press ram is at the bottom of its stroke;

FIG. 5 is an enlarged vertical sectional view similar to FIG. 3 but illustrating the position of the parts as the press ram is being raised;

FIG. 6 is a partial vertical sectional view through the operating means for the feed bar and the gripper mechanisms of the transfer assembly and taken substantially along the line 6—6 of FIG. 2;

FIG. 7 is a partial vertical sectional view taken substantially along the line 7—7 of FIG. 6;

FIG. 8 is a vertical sectional view through one of the gripper mechanisms of the transfer assembly and taken substantially along the lines 8—8 of FIGS. 2 and 9;

FIG. 9 is a horizontal sectional view through a gripper mechanism and taken substantially along the line 9—9 of FIG. 8;

FIG. 9A is an enlarged sectional view of a portion of the gripper mechanism and taken substantially along the line 9a—9a of FIG. 9;

FIG. 10 is a perspective view of the first and second rods of the gripper mechanism along with their gripper fingers carried thereby;

FIG. 11 is an exploded perspective view of the second rod and the rack carried thereby;

FIG 12 is a horizontal sectional view through the first and second rods of the gripper mechanism;

FIG. 13 is a vertical sectional view through the first and second rods taken substantially along the line 13—13 of FIG. 12; and FIG. 14 is a timing chart illustrating the timing and operation of the press ram, the feed bar, the gripper mechanism and the ejector means of the press and transfer assembly.

Referring first to FIGS. 1 and 2, a multi-station mechanical press is generally designated at 10. it includes a base 11 with uprights 12 which support a crown (not shown) which in turn carries the press crank for vertically reciprocating the press ram 13. The press bed 11 carries a bolster plate 14 which in turn carries a plurality of the die structures 15 arranged at stations longitudinally along the press. A magazine feeding device 16 and a discharge device 17 are also carried by the bed 11. The press ram 13 carries a plurality of punches 18 which are longitudinally arranged therealong and which cooperate with the die structures 15 to perform work functions on work pieces in the die structures 15 as the ram 13 is vertically reciprocated. The die structures 15 and punches 18 may perform substantially any desired work functions on the work pieces.

A typical die structure 15 and punch 18, such as those at the first station of the press, is illustrated in FIGS. 3, 4 and 5 and they may perform the work function of upsetting and squaring a length of sheared cylindrical bar stock 20 into a substantially cylindrical work piece 21 which may be further formed at the subsequent stations along the press. Here, the die structure 15 includes a carrier member 26 carried by the bolster plate 14 which in turn is carried by the bed 11 of the press. The carrier member 26 carries a backing member 27 and a die 28. A block 29 contains the die 28 and is held in place on the carrier member 26 by a ring 30. The upper surface of the die 28, block 29 and ring 30 form a feed surface 31 along which the work piece is fed by the transfer assembly of this invention. A movable anvil 32 is slidably mounted in the die 28 and carrier member 26 and it is raised to an elevated position as shown in FIG. 3 by a pin 33 operated by an ejector or lifter mechanism arranged in the press bed 11. The anvil is held in its elevated position, when elevated by the pin 33, by compressed air supplied through passage 35. When the pin 33 is lowered by the ejector or lifter mechanism and the anvil 32 is pressed downwardly against the air pressure, the anvil 32 bottoms or seats upon an anvil block 34 arranged within the carrier 26.

With regard to the ram punch 18, a block 37 carried by the movable ram 13 in turn carries a punch holder 38 which has a punch block 39 secured therein by a threaded retainer 40, the retainer 40 also securing a punch 41 in contact with the punch block 39. The punch 41 also carries a pin 42 which is normally urged downwardly by a pin 43 operated by a pneumatically operated pressure mechanism in the ram 13.

With the ram 13 in elevated position a length of sheared bar stock 20 is fed from the preceding station (here the magazine feed 16) by the closed gripper fingers 44, 45 of the associated gripper mechanism of the transfer assembly of this invention over the elevated anvil 32 which is being held in its elevated position by the air pressure under it. When the ram 13 is in its downward movement, as illustrated in FIG. 3, the pin 42 first engages the length of sheared bar stock 20 and pinches or grips the same between it and the elevated anvil 32. The sheared bar stock 20 is thereby held in centered position with respect to the die structure 15 so that the gripper fingers 44 and 45 may then be opened. As the ram continues to lower, the punch 41 engages the upper end of the sheared bar stock work piece 20, passes between the opened gripper fingers 44, 45, depresses the sheared bar stock work piece 20 into the die 28 and the anvil 32 against the anvil block 34, and forms the sheared bar stock piece 20 into the upset and squared work piece 21, as illustrated in FIG. 4.

As the ram is moving on its upstroke from the position illustrated in FIG. 4, the opened gripper fingers 44, 45 of the transfer assembly are closed and returned to the preceding station, and closed gripper fingers 44a, 45a are moved from the next succeeding station over the die 28 and work piece 21 therein, as illustrated in FIG. 5. As the ram 13 nears the top of its upstroke, the ejector or lifter mechanism in the press bed 11 operates through the pin 33 to raise the anvil 32 for ejecting or lifting the work piece 21 from the die 29 into the closed gripper fingers 44a, 45a. During the beginning of the downstroke of the press ram 13, the closed gripper fingers 44a, 45a transfer the upset and squared work piece 21 to the next succeeding station at the same time that the closed gripper fingers 44, 45 transfer a sheared bar stock piece 20 from the next preceding station to the instant station. This type of transfer occurs between the various stations along the press 10 as the press ram is lowered and raised to perform successive work functions on the work pieces as they are transferred from station to station along the press.

The transfer assembly of this invention is generally designated at 50 in FIGS. 1 and 2. It includes a feed bar 51 extending longitudinally along the press laterally adjacent the dies 15, magazine feed device 16 and discharge device 17. The feed bar 51 is longitudinally advanced and retracted a distance corresponding to the distance between the stations along the press. A plurality of gripper mechanisms 52 are carried by the feed bar for gripping and advancing the work pieces from station to station along the press. The gripper mechanisms 52 which operate gripper fingers are operated by an oscillatory rod 53 extending lengthwise of the feed bar 51. Operating means 54 carried by the bed 11 advance and retract the feed bar 51 and oscillate the rod 53 in timed relation with the press crank which raises and lowers the press ram. In this connection, cam means 55 are rotated in timed relation to the press crank, and pivoted levers 56 and 57 having cam follower rollers 58 and 59 operate to reciprocate rods 60 and 61 respectively in proper timed relation.

The operating means 54 for advancing and retracting the feed bar 51 and oscillating the rod 53 is diagrammatically illustrated in FIG. 6. It includes a housing 65 in which a first rod 66 having a reduced end 67 is slidably mounted by bearings 68 and 69 for longitudinally reciprocating motion. The rod 66 is provided with an abutment 70 and a bracket 71 carried by the rod 66 abuts against this abutment. The bracket 71 is held in place by a sleeve 72 threaded on to the rod extension 67 and locked in place by a set screw. The bracket 71 is provided with a pivot pin 73 for pivotally receiving one end of a link 74, the other end of the link 74 being pivoted by a pivot pin 75 to one leg of a bell crank lever 76. The bell crank lever 76 is provided with a stationary pivot 77 and its other leg is pivoted by a pivot pin 78 to the lower end of the rod 60. The pivot pin 75 is carried by a removable plug 79 which is splined as indicated at 80 to the bell crank lever 76. The pivot pin 75 is eccentrically located on the plug 79 so that as the plug 79 is rotatively positioned, the distance between the center of the pivot pin 75 and the center of the pivot 77 is varied. As a result, the amount of movement imparted to the rod 66 for a given movement of the rod 60 may be adjusted within limits. The splines 80 lock the plug 79 and hence the pivot pin 75 in the desired adjusted positions. The outer end of the rod 66 is connected by a coupling 81 to the feed bar 51 so that as the rod 66 is advanced and retracted the feed bar 51 is correspondingly advanced and retracted. With the parts in the position shown in FIG. 6 the rod 60 is in its down position and the rod 66 is in its retracted position. As the rod 60 is raised, the rod 66 is advanced to the advanced position and as the rod 60 is lowered, the rod 66 is retracted to its retracted position.

The operating means 54 also includes a second rod 84 which is mounted by a bearing 85 for both longitudinal and rotative motion. The rod 84 is provided with an internally splined sleeve 86 which engages a splined rod 88, the parts being held in assembled relation by a pin 87. The splined rod 88 is splined to a gear 89 which is journaled for rotation in bearings 90 and 91. As the gear 89 is rotated, the splined rod 88 and the rod 84 are rotated thereby. At the same time the rods 88 and 84 are permitted to move longitudinally with respect to the gear 89. The gear 89 meshes with a rack 92 on the vertically reciprocatable rod 61. Accordingly, as the rod 61 is vertically reciprocated, rotation is imparted to the shaft 84 and the shaft 84 may be reciprocated. As shown in FIG. 7, a back up roller 93 holds the rack 92 in engagement with the gear 89. A fitting 94 is secured to the free end of the rod 84 by pins 95 and is provided with a splined connection 96 to the rod 53 which operates the gripper mechanisms. An annular member 97 is secured to the rod 84 by a pin 98 and this annular member 97 seats in a slot in a block 99 carried by the bracket 71. Thus, as the bracket 71 is reciprocated to reciprocate the feed bar 51 the rod 84 is correspondingly reciprocated, the annular member 97 permitting rotation of the rod 84. The ends of the rods 67 and 88 where they project from the bearings 68 and 90 are enclosed by suitable capped sleeves 100 and 101.

The gripper mechanism 52 for opening and closing the gripper fingers 44 and 45 is illustrated in more detail in FIGS. 8 to 13. Here, the gripper mechanism includes a housing 105 which is provided with a mounting flange 106 for mounting the gripper mechanism on the feed bar 51 as by means of screws 107 or the like. The housing 105 is provided with an end wall 108 and an interior wall 109. A first rod 110 having an enlarged splined portion 111 is slidably mounted in the housing 105 by a bearing 112 in the end wall 108 and a splined bearing 113 in the interior wall 109. The splined bearing 113 prevents rotation of the rod 110. The inner end of the rod 110 is screw threaded to receive a nut 114 which backs a washer 115. The nut 114 and the washer 115 abut against the splined bearing 113 to operate as stop means for fixing the advanced position of the rod 110. The outer end of the rod 110 has a reduced portion 121 with a flattened surface thereon for receiving a bracket 120 forming part of the gripper finger 44. The bracket 120 is held in place on the reduced portion of the rod 110 by a washer 122 and a screw 123. The bracket 120 is bifurcated and a bar 124 received within the bifurcation engages the flat on the extension 121, the bar 124 being clamped in position by screws 125. In this way, rotation of the finger 44 with respect to the rod 110 is prevented. Preferably the finger 44 has oblique surfaces 126 for engaging the work piece 20.

A second rod 128 having an enlarged splined portion 129 is slidably mounted in the housing 105 by a bearing 130 and a splined bearing 131, the splined bearing 131 preventing rotation of the rod 128. Here, also the outer end of the rod 128 is provided with a reduced extension 132 for receiving a bracket 131 of the other gripper finger 45. The bracket 131 is held on the rod 128 by a washer 133 and a screw 134 and rotation of the bracket 131 with respect to the rod 128 is prevented by a bar 135 engaging a flat on the extension 132 and secured in place by screws 136. Here, the gripper finger 45 is preferably provided with a flat surface 137 for engaging the work piece 20.

As shown more clearly in FIG. 11, the enlarged splined portion 129 of the second rod 128 is provided with a recess produced by cross milling as indicated at 140 and longitudinal milling as indicated at 141 for receiving a rack block 142. The rack block 142 has a central bore 143 partially therethrough which receives a spring 144. This spring 144 operates to bias the rack block 142 to the right with respect to the rod 128 as illustrated in FIGS. 9, 10, and 12 so as to provide a spring biased lost motion connection between the rack 142 and the second rod 128. The enlarged portion 111 of the first rod 110 is also provided with a pair of recesses which are circumferentially spaced by 90°, these recesses also being provided by cross milling 140 and longitudinal milling 141 as described above. A rack block 146 is located in one of these recesses but here the length of the rack block 146 corresponds to the length of the recess so that no lost motion is provided between the rack block 146 and the rod 110. The other recess in the rod 110 receives a rack block 147 which is biased to the left as illustrated in FIGS. 8, 9, 10 and 12 by a spring 148. Thus, there is a spring biased lost motion connection between the rack 147 and the first rod 110.

A pin 150 is vertically mounted in the housing 105 between the first and second rods 110 and 128 by a mounting member 151 secured to the housing. An idler gear 152 is rotatably carried by the pin 150 and it engages the racks 142 and 146. Thus, as the first rod 110 is advanced, the second rod 128 is retracted and, vice versa, as the first rod 110 is retracted, the second rod 128 is advanced. A shaft 154 is rotatably mounted in the housing 105 above the rods 110 and 128 by bearings 155. The outer ends of the rod 154 are splined for connection to the rod 53 which is oscillated by the operating means 54. This shaft 154 carries a gear 156 meshing with the rack 147 carried by the first rod 110.

With the parts in the position illustrated in FIGS. 8 to 13 the rod 110 is advanced and the rod 128 is retracted so that the gripper fingers 44 and 45 are gripping the work piece 20. The nut 114 and washer 115 are engaging the splined bearing 113 for fixing the advanced position of the first rod 110 and the gripper finger 44. Any movement at the gear 156 and, hence, the rack 147 beyond this fixed position of the rod 110 is permitted by the spring biased lost motion connection between the rack 147 and the rod 110. The second rod 128 is maintained in a retracted position by the rack 146, idler gear 152 and rack 142. In this position the spring biased lost motion connection between the rack 142 and the second rod 128 causes spring pressure to be exerted by the finger 45 on the work piece 20. Thus, the work piece 20 is firmly gripped with a resilient force by the fingers 44 and 45.

When the gear 156 is rotated to retract, the first rod 110, the rack 146, idler gear 152 and rack 142 operate to advance the second rod 128 for the purpose of separating the fingers 44 and 45 to release the work piece 20 so that the punch and die of the press may perform a work function thereon in the manner decribed above. After the work piece has been released at such a station, the feed bar 51 is retracted to return the gripper mechanism 52 to the next preceding station and at this next preceding station the gripper fingers 44 and 45 are closed by reverse rotation of the gear 156. This reverse rotation advances the gripper finger 44 to the precise advanced position as determined by the nut 114 and washer 115 and the finger 45 is moved to its retracted position by the rack 146, gear 152 and rack 142. When the fingers are so closed at the next preceding station, a new work piece is forced between the fingers 44 and 45 so as to be gripped thereby. This forcing of the work piece 20 between the fingers 44 and 45 is permitted by the spring biased lost motion connection between the rack 142 and the second rod 128 and the action of this spring biased lost motion connection operates to resiliently grip the work piece forced between the fingers.

The inner end of the second rod 128 may be provided with a screw 160 as shown more clearly in FIGS. 9 and 9A. The head of this screw 160 is adapted to engage a contact screw 161 adjustably positioned in a plate 162 which is secured by bolts 163 to a cover 167 carried by the housing 105. The plate 162 and the bolts 163 are electrically insulated from the cover 167 by annular discs 164 and sleeves 165 and 166 made of electrical insulating material. The precise adjusted position of the contact screw 161 is maintained by a lock nut 168. The engagement or disengagement of the contact screw 161 by the screw 160 on the second rod 128 may be utilized for providing indicating or control signals, as in accordance with the diameter of the work piece 20 inserted between the fingers 44 and 45. For example, if the work piece 20 is oversized, the screw 160 is unable to contact the contact screw 161 which would give an indication that the work piece 20 is oversized. On the other hand, electrical circuitry could be so arranged that if the work piece 20 were undersized to allow the screw 160 to engage the contact screw 161 then an indication could be had that the work piece 20 is undersized.

Referring now to FIG. 14, the timing sequences of the press and transformer assembly are set forth. Here, the chart shows 360° rotation of the press crank shaft and the movements of the press ram 13, the feed bar 51, the fingers 44 and 45 and the ejector or lifter mechanism for operating the ejector or lifter pins 33. The movement of the press ram is illustrated by the curve 170, the feed bar by the curve 171, the fingers by the curve 172 and the ejector or lifter mechanism by the curve 173. When the press ram 13 is at the top of its stroke, the feed bar 51 is in its retracted position, the gripper fingers 44, 45 are closed, and the lifter pin 33 has been raised to raise the anvil 32 to insert a work piece in the closed gripper fingers. As the press ram descends, the lifter pin 33 is lowered but the anvil 32 remains in its raised position due to the air pressure thereunder, and the feed bar 51 is advanced to its advanced position to transfer the work piece. The pressure operated pin 42 of the punch then pinches the work piece between it and the raised anvil 32 and the gripper fingers 44, 45 then open. The punch 41 then forces the work piece into the die 28 to perform its work function on the work piece, the work function being completed at the bottom of the ram stroke. As the ram rises, the feed bar 51 is retracted and during this retracting movement the gripper fingers 44, 45 are closed. When the feed bar 51 is in its retracted position with its fingers closed, the lifter pin 33 is raised near the top of the upstroke of the press ram to insert a new work piece into the closed gripper fingers for a repeat of the above described cycle. It is only the 45° rise portion of the curve 173 which raises the lifter pin.

While for purposes of illustration one form of this invention has been disclosed, other forms thereof may become apparent to those skilled in the art upon reference to this disclosure and, therefore, this invention is to be limited only by the scope of the appended claims.

The claims:

1. In a multi-station press having a bed, a plurality of dies carried by and arranged along the bed, a vertically reciprocatable ram above the bed, a plurality of punches carried by the ram and cooperating with the dies to perform work functions on work pieces in the dies as the ram is vertically reciprocated, and a transfer assembly including a feed bar longitudinally movable in opposite directions, and a plurality of gripper mechanisms carried by the feed bar for gripping and transferring the work pieces from die to die along the press as the feed bar is longitudinally moved, the improvement wherein each said gripper mechanism includes a gripper housing carried by the feed bar, first and second rods slidably carried by the housing for lengthwise movement transversely of the feed bar and extending from said housing toward a die, said first rod having an outwardly facing gripper finger on its end above the die and said second rod having an inwardly facing gripper finger on its end above the die, said first rod being advanced to an advanced position and said second rod being retracted to a retracted position for closing the gripper fingers thereof to grip a work piece therebetween centrally above a die, and said first rod being retracted to a retracted position and said second rod being advanced to an advanced position for opening the gripper fingers thereof to release the work piece therefrom centrally above a die, and driving means for simultaneously advancing said first rod and retracting said second rod and simultaneously retracting said first rod and advancing said second rod.

2. The combination of claim 1 including stop means for fixing the advanced position of said first rod to accurately center the closed finger thereof with respect to the associated die.

3. The combination of claim 2 wherein said driving means includes a spring biased lost motion connection to said first rod which is resiliently effective when advancing the first rod to its fixed advanced position.

4. The combination of claim 3 wherein said driving means also includes a spring biased lost motion connection to said second rod which is resiliently effective when retracting the second rod to its retracted position where the closed finger thereof grips the work piece.

5. The combination of claim 1 wherein said driving means includes spring biased lost motion connections to said first and second rods which are resiliently effective when advancing said first rod and retracting said second rod.

6. The combination of claim 1 wherein said driving means includes a spring biased lost motion connection to said second rod which is resiliently effective when retracting the second rod to its retracted position when the closed finger thereof grips the work piece.

7. The combination of claim 6 including switch means controlled by said second rod as it is retracted to its retracted position.

8. The combination of claim 1 wherein said driving means includes a rack on said first rod, a rack on said second rod, and driving gears engaging said racks for advancing and retracting said rods.

9. The combination of claim 8 including a spring biased lost motion connection between said first rod and its rack which is resiliently effective when the first rod is being advanced.

10. The combination of claim 9 including stop means for fixing the advanced position of said first rod to accurately center the closed finger thereof with respect to the associated die.

11. The combination of claim 8 including a spring biased lost motion connection between said second rod and its rack which is resiliently effective when the second rod is being retracted.

12. The combination of claim 9 including a spring biased lost motion connection between said second rod and its rack which is resiliently effective when the second rod is retracted to its retracted position where the closed finger thereof grips the work piece.

13. The combination of claim 1 wherein said driving means includes a first rack on said first rod, a driving gear engaging said first rack for advancing and retracting said first rod, a second rack on said first rod, a third rack on said second rod, and an intermediate driving gear engaging said second rack and said third rack for retracting and advancing said second rod as the first rod is advanced and retracted.

14. The combination of claim 13 including a spring biased lost motion connection between said first rod and said first rack which is resiliently effective when the first rod is being advanced.

15. The combination of claim 14 including stop means for fixing the advanced position of said first rod.

16. The combination of claim 13 including a spring biased lost motion connection between said second rod and said third rack which is resiliently effective when the the second rod is being retracted.

17. The combination of claim 14 including a spring biased lost motion connection between said second rod and said third rack which is resiliently effective when the second rod is being retracted.

18. The combination of claim 15 including a spring biased lost motion connection between said second rod and said third rack which is resiliently effective when the second rod is being retracted.

19. The combination of claim 1 including operating means for longitudinally moving and positioning said feed bar to position said feed bar in a retracted position with the gripper fingers above one die as the ram approaches the top of its upstroke, to advance the feed bar toward an advanced position as the ram descends from the top of its downstroke, to position the feed bar in the advanced position with the gripper fingers above the next adjacent die as the ram approaches the bottom of its downstroke, and to retract the feed bar toward the retracted position as the ram rises from the bottom of its upstroke, and operating means for said driving means of the gripper mechanism to maintain the gripper fingers closed while said feed bar is in said retracted position with said gripper fingers above said one die and while said feed bar is being advanced toward said advanced position, to open the gripper fingers when said feed bar is in said advanced position with the gripper fingers over said next adjacent die, to maintain the gripper fingers opened when the feed bar starts its movement toward the retracted position, and to close the gripper fingers as the feed bar completes its movement toward said retracted position, said closed gripper fingers gripping a work piece from said one die and the opening of said gripper fingers releasing the work piece at said next adjacent die.

20. The combination of claim 19 including ejector means for said dies for ejecting work pieces therefrom, and means for operating said ejector means to eject a work piece from said one die into the closed gripper fingers thereover.

21. The combination of claim 20 including a pressure biased member associated with each of the ram punches for pinching the work piece between it and the ejector means of said next adjacent die to hold the work piece as the gripper fingers above said next adjacent die are opening prior to the punch performing a work function on the work piece in said next adjacent die.

22. In a multi-station press having a bed, a plurality of dies carried by and arranged along the bed, a vertically reciprocatable ram above the bed, a plurality of punches carried by the ram and cooperating with the dies to perform work functions on work pieces in the dies as the ram is vertically reciprocated, and a transfer assembly including a feed bar longitudinally movable in opposite directions, and a plurality of gripper mechanisms carried by the feed bar and having gripper fingers above the dies for gripping and transferring the work pieces from die to die along the press as the feed bar is longitudinally moved, in combination therewith, driving means for said gripper mechanism for simultaneously opening and closing the gripper fingers thereof, operating means for longitudinally moving and positioning said feed bar to stationarily position said feed bar in a retracted position with the gripper fingers above one die as the ram approaches the top of its upstroke, to advance the feed bar toward an advanced position as the ram descends from the top of its downstroke, to stationarily position the feed bar in the advanced position with the gripper fingers above the next adjacent die as the ram approaches the bottom of its downstroke, and to retract the feed bar toward the retracted position as the ram rises from the bottom of its upstroke, and operating means for said driving means of the gripper mechanism to maintain the gripper fingers closed while said feed bar is in said retracted position with said gripper fingers above said one die and while said feed bar is being advanced toward said advanced position, to open the gripper fingers when said feed bar is in said advanced position with the gripper fingers over said next adjacent die, to maintain the gripper fingers opened when the feed bar starts its movement toward the retracted position, and to close the gripper fingers as the feed bar completes its movement toward said retracted position, said closed gripper fingers gripping a work piece from said one die and the opening of said gripper fingers releasing the work piece at said next adjacent die.

23. The combination of claim 22 including ejector means for said dies for ejecting work pieces therefrom, and means for operating said ejector means to eject a work piece from said one die into the closed gripper fingers thereover.

24. The combination of claim 23 including a pressure biased member associated with each of the ram punches for pinching the work piece between it and the ejector means of said next adjacent die to hold the work piece as the gripper fingers above said next adjacent die are opening prior to the punch performing a work function on the work piece in said next adjacent die.

References Cited

UNITED STATES PATENTS

| | | | |
|---|---|---|---|
| 2,058,699 | 10/1936 | Lehman | 72—405 |
| 2,687,660 | 8/1954 | Friedman | 72—405 |

LOWELL A. LARSON, Primary Examiner

U.S. Cl. X.R.

72—405